June 6, 1961 J. H. GRAY 2,987,279
SHOCK-ABSORBING SUSPENSION SYSTEM FOR PARACHUTE
Filed June 18, 1956 3 Sheets-Sheet 1
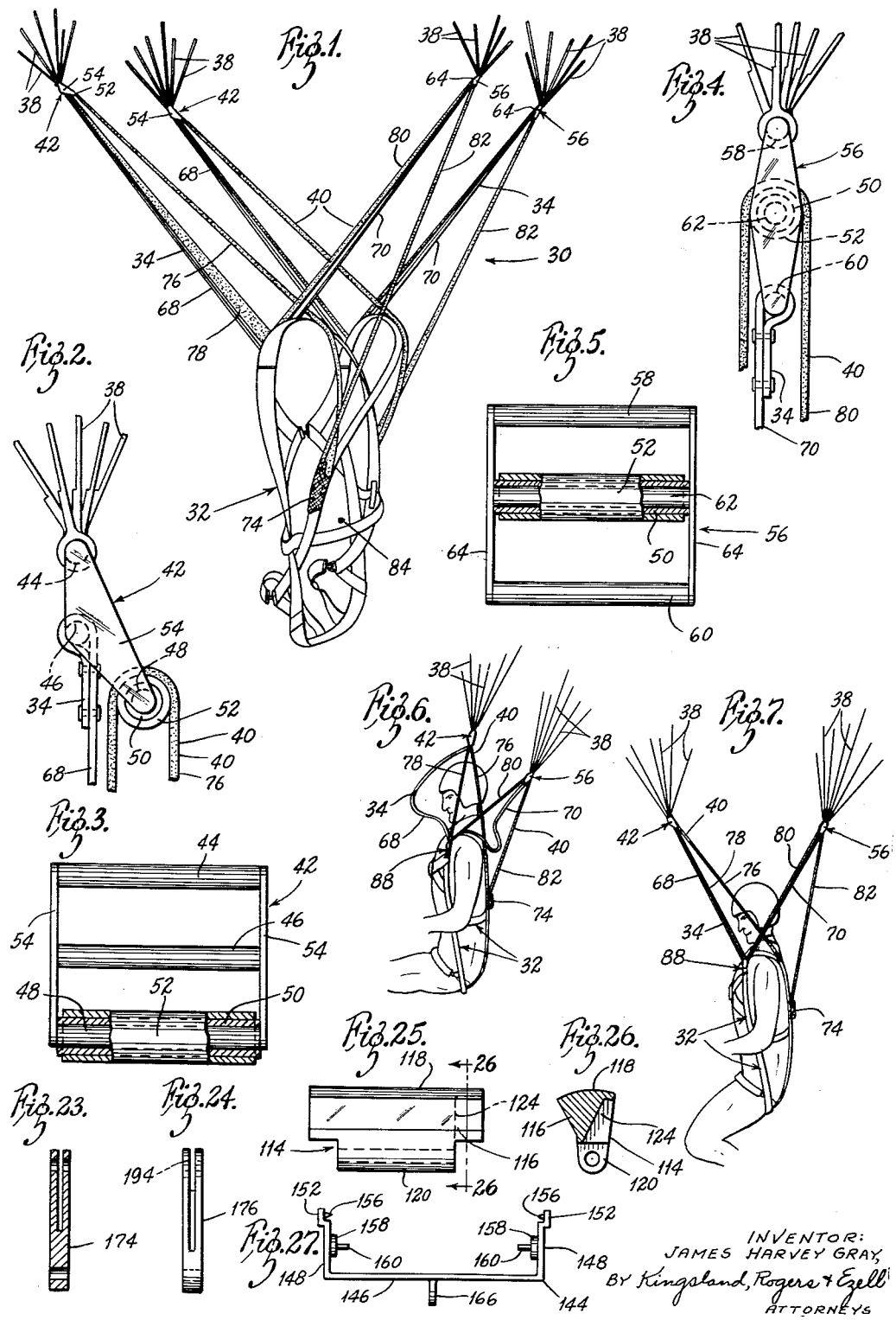
INVENTOR:
JAMES HARVEY GRAY,
BY Kingsland, Rogers & Ezell
ATTORNEYS

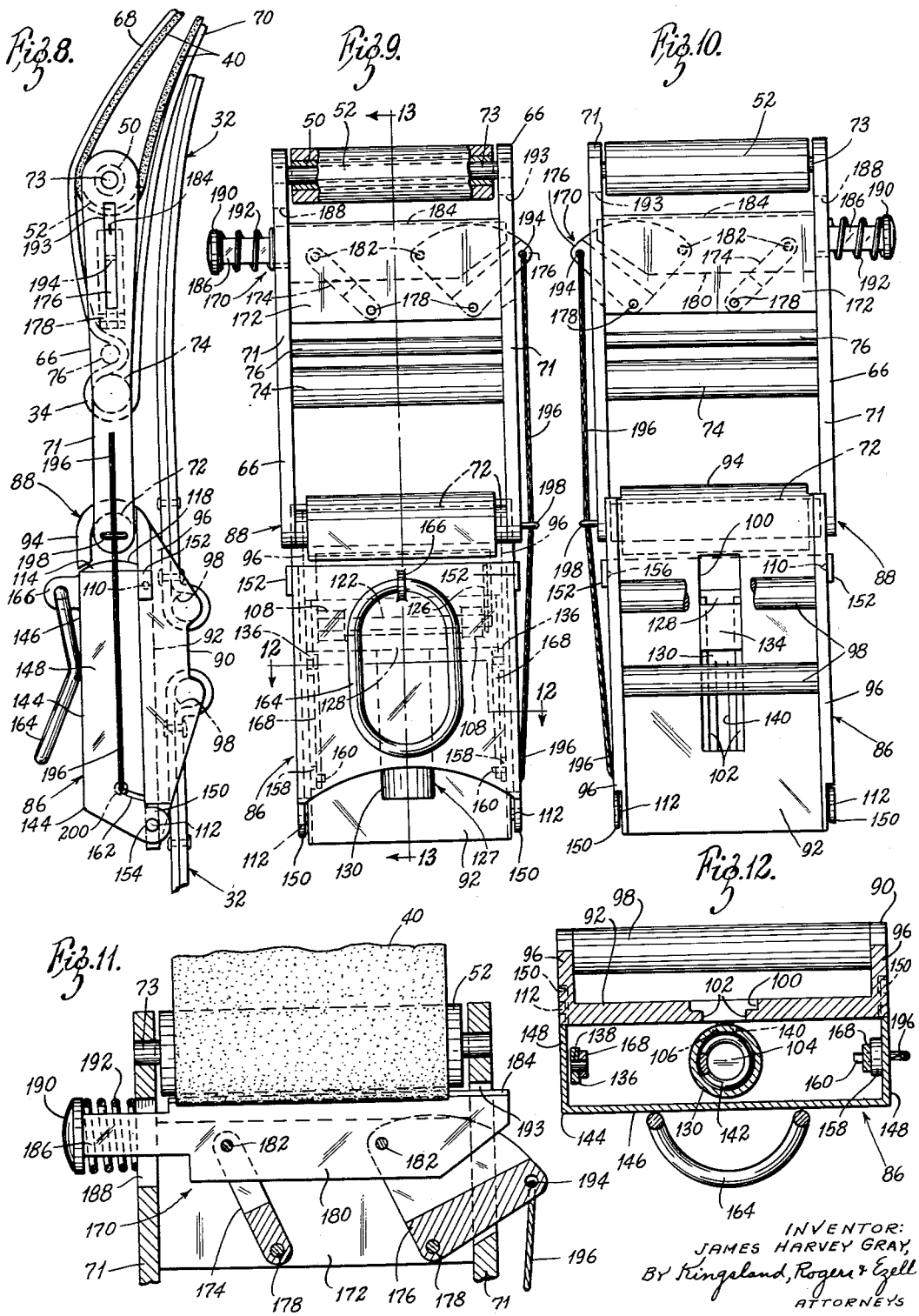

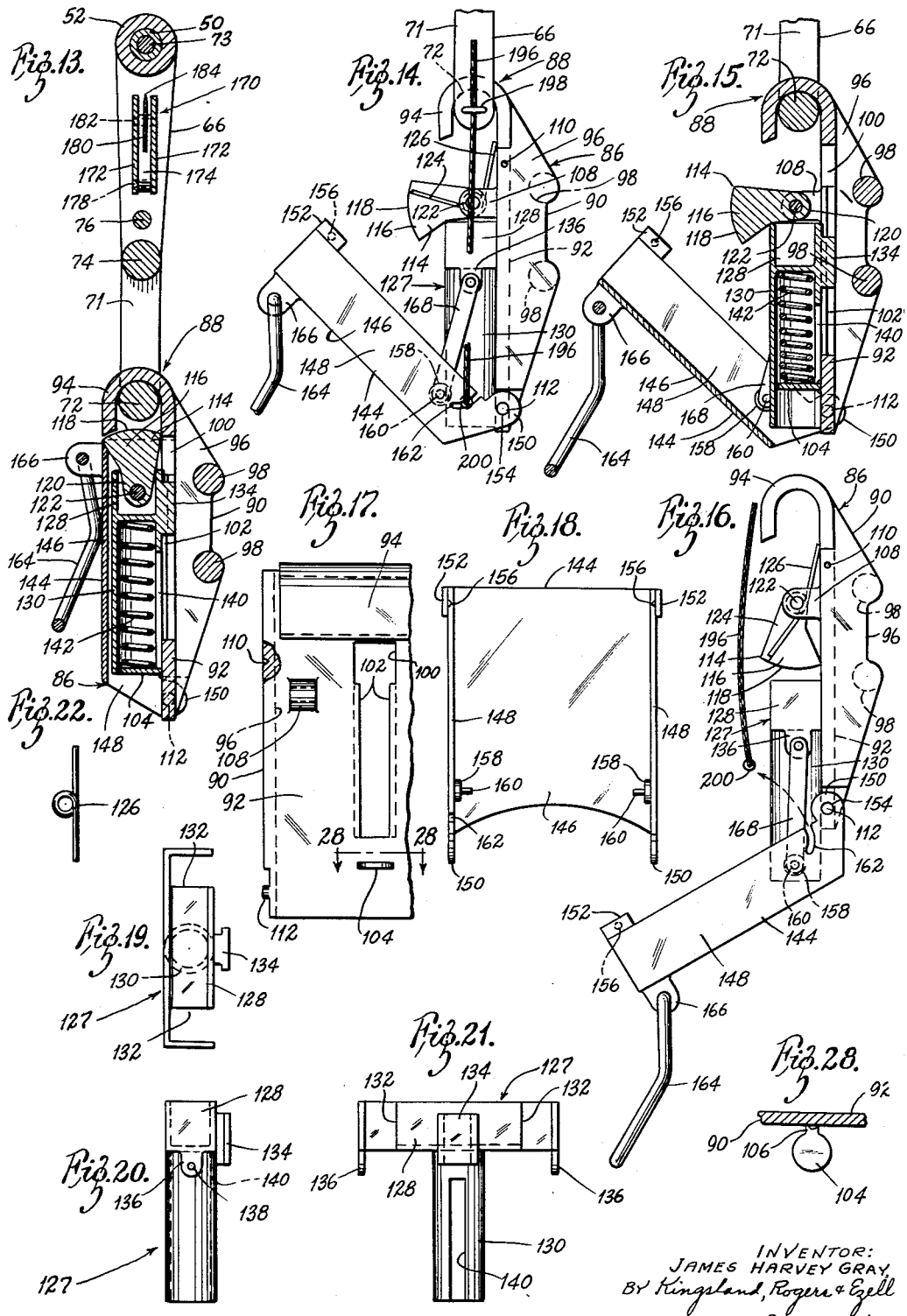

United States Patent Office 2,987,279
Patented June 6, 1961

2,987,279
SHOCK-ABSORBING SUSPENSION SYSTEM FOR PARACHUTE
James H. Gray, St. Louis, Mo., assignor to Harvey Gray and Associates, Inc., Clayton, Mo., a corporation of Missouri
Filed June 18, 1956, Ser. No. 592,001
21 Claims. (Cl. 244—151)

The present invention relates generally to parachutes, and more particularly to a novel shock-absorbing suspension system for easing the shock of an opening parachute.

The problems engendered by the ever mounting flight speeds and altitudes which accompany continued progress in aeronautical development are not restricted to the design and construction of flight equipment. They extend with increasing significance to accessories, such as parachutes, which may have a direct and critical relationship to the speeds and altitudes at which they are put into use. Considering parachutes, under normal circumstances of use, whether in an emergency or a routine drop involving either personnel or cargo, it is the brief moment during which the parachute canopy opens that it is critical, both as to the ability of the parachute itself to remain intact and as to the ability of the user to withstand the arresting shock. The degree of shock is, of course, a function of the velocity of the person or cargo which must be arrested as the parachute canopy opens.

Although it is immediately perceived that the solution of the foregoing problem lies in the provision of appropriate means for absorbing the opening shock, past attempts to provide such means have proved inadequate to attain the objectives which must be fulfilled.

It is an object of the present invention, therefore, to provide a parachute having novel shock absorbing means incorporated therein.

It is another object of the invention to provide a novel shock absorbing suspension system for a parachute.

It is another object of the invention to provide a novel shock absorbing parachute suspension system employing yieldable, non-resilient tension elements.

It is another object of the invention to provide a novel shock absorbing parachute suspension system having yieldable, non-resilient tension elements in self-equalizing arrangement.

It is another object of the invention to provide a novel shock absorbing parachute suspension system which incorporates canopy release means.

It is another object of the invention to provide a novel canopy release assembly for a parachute.

The foregoing, along with additional objects and advantages, will be apparent from the following description of a specific embodiment of the invention as depicted in the accompanying drawings, in which:

FIGURE 1 is a general perspective view of an opened parachute suspension system constructed in accordance with the teachings of the present invention, the parachute canopy and portions of the suspension lines attached thereto being broken away in order to save space on the drawing;

FIGURE 2 is a fragmentary side elevation showing a front riser end fitting forming a part of the suspension system;

FIGURE 3 is a front elevation, partly in section, of a removed front riser end fitting;

FIGURE 4 is a fragmentary side elevation showing a back riser end fitting forming a part of the suspension system;

FIGURE 5 is a front elevation, partly in section, of a removed back riser end fitting;

FIGURE 6 is a schematic representation illustrating the shock absorbing action of the suspension system at the instant of opening of the parachute canopy;

FIGURE 7 is a schematic representation showing the suspension system in fully opened condition after absorbing the shock of the canopy opening;

FIGURE 8 is a fragmentary side elevation showing a canopy release assembly forming a part of the suspension system;

FIGURE 9 is a front elevation, partly in section, of a removed canopy release assembly;

FIGURE 10 is a rear elevation of the removed canopy release assembly, a portion thereof being broken away to show additional details of structure;

FIGURE 11 is an enlarged fragmentary vertical section, partly in elevation, showing the upper end of the canopy release assembly with a cutting assembly in actuated position;

FIGURE 12 is an enlarged horizontal section taken generally along the line 12—12 of FIGURE 9;

FIGURE 13 is a vertical section taken generally along the line 13—13 of FIGURE 9;

FIGURE 14 is a fragmentary side elevation showing the lower end of the canopy release assembly with elements in partly actuated position;

FIGURE 15 is a fragmentary vertical section taken on a median plane through the structure of FIGURE 14;

FIGURE 16 is a side elevation generally similar to FIGURE 14, but with the parts in fully actuated position;

FIGURE 17 is a fragmentary front elevation of a removed base member forming part of the canopy release assembly;

FIGURE 18 is a rear elevation of a removed actuator;
FIGURE 19 is a top plan view of a removed retainer;
FIGURE 20 is a side elevation thereof;
FIGURE 21 is a rear elevation thereof;
FIGURE 22 is a side elevation of a removed torsion spring;

FIGURE 23 is a central vertical section of a removed toggle link;

FIGURE 24 is an end elevation of a removed toggle quadrant;

FIGURE 25 is a front elevation of a removed latch dog;

FIGURE 26 is a vertical section taken generally on the line 26—26 of FIGURE 25;

FIGURE 27 is a top plan view of the actuator of FIGURE 18; and

FIGURE 28 is a fragmentary horizontal section taken generally along the line 28—28 of FIGURE 17.

Referring more particularly to the details of the drawings as indicated by the reference characters directed thereto, the numeral 30 designates generally a suspension system conforming to the present invention. The suspension system 30 is depicted in FIGURE 1 in opened condition and comprises a body harness assembly 32, a pair of riser straps 34, four groups of suspension lines 38 and a pair of shock absorbing straps 40. In addition, appropriate connecting fittings, including a canopy release assembly, are provided in the suspension system 30.

It may be mentioned at this point that the shock absorbing straps 40 are preferably fabricated from synthetic fibers, such as nylon, in what is conventionally termed an "undrawn" condition woven into a web strap. The straps 40, thus fabricated, are yieldable under a tension load as will appear hereinafter, and, being once "drawn," will normally be replaced in the suspension assembly 30. It is to be understood, then, that the opened condition of the suspension system 30 as depicted in FIGURE 1, indicates that the shock absorbing straps 40 have been stretched out, or drawn, to a length which substantially exceeds their original length. It will also be noted that stippling has been employed in the drawings to distinguish the stretchable straps 40 from the riser straps 34.

Returning to consideration of FIGURE 1, the suspension lines 38, which depend in the usual manner from the peripheral edge of the parachute canopy (not shown), are gathered together to form four distinct groups. The several lines 38 of each group are secured in any appropriate manner to an associated end of a riser strap 34 by means of riser end fittings. Thus, FIGURE 3 depicts a front riser end fitting 42 having an upper bar 44 to which the particular lines 38 associated with this fitting are secured. The fitting 42 has, in addition to the upper bar 44, a central bar 46 and a lower bar 48, the latter provided with a bushing 50 and a roller 52. The several bars are joined by integral side elements 54. In contrast to the front riser end fitting 42, FIGURE 5 illustrates a back riser end fitting 56 of generally similar type, but having upper and lower bars 58 and 60 and a center bar 62 joined by integral side elements 64. The bar 62, like the bar 48 previously described, is provided with a bushing 50 and a roller 52. It will, of course, be understood that assembly of the elements 50 and 52 on the bars 48 and 62 will require either that the bars be inserted through the end elements 54 or 64, or that one of the latter be assembled as a final step in the fabrication of the fitting.

FIGURES 2 and 4 show clearly the attachment of suspension lines 38 to the upper bars 44 and 58 of the respective fittings 42 and 56. In addition, these figures illustrate the attachment of respective ends of a riser strap 34 to the end fittings 42 and 56. Finally, it is apparent from these figures that a shock absorbing strap 40 is passed through each of the fittings 42 and 46 in a manner to make use of the rolling characteristics of the rollers 52.

The riser straps 34 are preferably of standard web construction and, in addition to having the above described end connection with fittings 42 and 46, each has a central portion in non-slipping engagement with a respective lower riser fitting 66, as illustrated in FIGURE 8. Thus, as here disclosed, each lower riser fitting 66 divides its associated riser strap 34 into a front riser 68 and a back riser 70. It is, of course, obvious that the front and back risers 68 and 70, could, if desired, comprise individual lengths of webbing.

As best shown in FIGURES 9 and 13, the lower riser fitting 66 has opposed side elements 71 which embrace a lower bar 72, an upper bar 73, and a pair of intermediate bars 74 and 76. The upper bar 73 is provided with a bushing 50 and a roller 52 similar to the fittings 42 and 56 above described. The lower riser fitting 66 incorporates also a cutter assembly which will be described hereinafter.

Referring now to FIGURE 8, the central portion of the web riser strap 34 is threaded in a tortuous path around and between the intermediate bars 74 and 76 so as to provide non-slipping securement between the strap 34 and the fitting 66. Once more, it will be noted that the shock absorbing strap 40 passes around the roller 52 associated with the fitting 66.

Referring once more to FIGURE 1, it is evident that one riser strap 34 comprising one front riser 68 and one back riser 70 is secured to the left-hand side of the body harness 32, and that an identical arrangement prevails on the right-hand side of the harness 32. Similarly, there is one shock absorbing strap 40 on the left-hand side of the harness 32 and one on the right-hand side. Now, considering the left-hand shock absorbing strap 40, it will be observed that both of its ends are secured at adjacent points on the harness 32. This securement may take any appropriate form, and, as here illustrated, comprises a webbing pad 74 which may be stitched, riveted, or otherwise secured to the harness 32. From this point of attachment, the left-hand shock absorbing strap 40 extends upwardly over the back of the harness 32 and therebeyond in what may be termed a rear front strand or run 76, then over the roller 52 in the left-hand front riser fitting 42 to return downwardly in a forward front run 78. This same strap 40 then passes under the roller 50 in the lower riser fitting 66 and again extends upwardly as a forward back run 80, thence over the roller 52 in the left-hand back riser fitting 56 to return downwardly as a rear back run 82 to end at the webbing pad, 74. The right-hand shock absorbing strap 40, is, of course, arranged in a similar manner.

It may be mentioned, incidentally, that the point of attachment of the straps 40, namely, the webbing pad 74, is preferably located at a point on the harness 32 which will normally be above the center of gravity of the person using the device. This arrangement is indicated in FIGURE 1 by the relative positions of the pad 74 and a center of gravity symbol 84.

Returning now to the illustration of FIGURE 8, the lower riser fitting 66 is releasably engaged to the harness assembly 32 by means of a receiver assembly 86 incorporated in the latter. Thus, the fitting 66 and the receiver assembly 86 together comprise a canopy release assembly 88 by means of which the parachute canopy (not shown) and certain elements of the suspension system 30 may be detached from the harness 32.

The receiver assembly 86 includes a main base member 90 formed to the shape clearly indicated in FIGURES 12, 13, 16 and 17. Thus, the member 90 includes a main plate portion 92 of generally rectangular shape having its upper end extended and reversed to form a hook 94. Parallel flange portions 96 extend rearwardly from the lateral edges of the plate section 92 and are interconnected by vertically spaced parallel bars 98. It is by means of the bars 98 that the receiver assembly 86 is incorporated as part of the body harness 32, the interconnection being clearly illustrated in FIGURE 8.

As best shown in FIGURES 12 and 17, the base plate section 92 is provided with an elongated slot 100 having opposed inwardly extending flanges 102 to form a T-slot arrangement. The upper end of the slot 100 has the flanges eliminated so as to provide an access opening for a purpose to be described. A shelf plate 104 of generally disc-like form and having a stem 106 is secured, as by welding, in horizontal position immediately below the lower end of the slot 100 as clearly illustrated in FIGURES 17 and 28. A pair of bearing lugs 108 project forwardly from the face of the plate 92 and are disposed on opposite sides of the slot 100. The side edges of the plate-like section 92 each have an indentation 110 formed therein. These are illustrated in FIGURES 14 and 17, which also show the lower ends of the same outside plate edges to be relieved in such manner as to provide laterally extending pintles 112.

The parts which, with the member 92, comprise the receiver assembly 86 are assembled as clearly illustrated in FIGURES 13 through 16. They include a latch dog 114 shaped, as clearly indicated in FIGURES 25 and 26, to have an upper blocking portion 116 terminating in an arcuate surface 118 and having a lower mounting portion 120 drilled to receive a pin 122 by means of which the dog 114 is pivotally mounted between the lugs 108. One end of the dog 114 is relieved as at 124 to provide space for a torsion spring 126, shown removed in FIGURE 22, which serves to bias the dog 114 forwardly and downwardly toward the open position illustrated in FIGURE 16.

The assembly 86 further includes a retainer 127, shown in FIGURES 19 through 21 to be generally T-shaped, having a horizontal upper trough-like portion 128 and a depending tubular portion 130. The portion 128 is in the general shape of an elongated open-topped box, except for the formation of notches 132 at each end, as illustrated best in FIGURE 19. A T-shaped lug 134 projects rearwardly from the center of the trough-like portion 128 and a depending ear 136 is provided at each end of the portion 128, as best illustrated in FIGURES 20 and 21. Each ear 136 is provided with an aperture 138. As best shown in FIGURE 21, the tubular member 130 is provided with a longitudinal slot 140 opening rearwardly and extending from the bottom thereof over the greater portion of its length.

Referring once again to the figures showing the assembled parts, and particularly FIGURES 13 and 15, the retainer 127 is disposed with its lug 134 in interlocking sliding engagement with the flanged slot 100 formed in the base member 92, and it will be observed that the shelf disc 104 is disposed within the tubular portion 130 by virtue of the sliding fit of the slot 140 over the neck portion 106. A compression spring 142 is disposed within the tubular element 130 and rests upon the shelf disc 104 in a manner to bias the retainer 126 upwardly toward the latch dog 114.

An actuator 144, shown removed in FIGURE 18, is of channel shape and has a web portion 146 which joins parallel flange portions 148, each of the latter having a lower ear extension 150 and an upper offset ear extension 152. The ear extensions 150 are provided with apertures 154 for receiving the aforementioned pintles 112 adjacent the lower end of the base member 92. The offset ears 152 are each provided with an inwardly extending nib 156 for detent cooperation with the indentations 110 also formed in the base member 92. Each of the flanges 148 of the actuator 144 is also provided with a spacing lug 158 and an inwardly extending pintle 160, these elements being in opposed relation as clearly illustrated in FIGURE 18; and in addition, one of the flanges 148, illustrated as the left-hand flange of the device depicted in FIGURE 18, is provided with an arcuate slot 162. This slot 162, shown also in the side elevational views of FIGURES 14 and 16, is for a purpose to appear.

The actuator 144 is provided with a thumb ring 164 which pivotally engages a forwardly extending lug 166 at the center top of the web portion 146. Preferably, the thumb ring 164 has a forward bend for ease in inserting a thumb therein.

The actuator 144 is connected to the retainer 127 by means of simple links 168 engaged at one end over the pintles 160 and being pinned at the other end through the apertured retainer ears 136.

Returning once more to consideration of the canopy release assembly 88, which includes the receiver assembly 86 and the lower riser fitting 66, it will be observed that the latter is provided with a cutting assembly 170. Thus, the lower riser fitting 66 is provided with parallel plates 172 illustrated in FIGURE 13 and extending between the side elements 71. The plates 172 are spaced apart just far enough to accommodate a toggle link 174 and a toggle quadrant 176. These elements are pivotally mounted to the plates 172 by means of pins 178, as shown in FIGURE 11. This figure also shows, along with FIGURES 23 and 24, the slotted construction of the members 174 and 176 which enables these members to receive a cutting blade 180. Pivoted attachment of the toggle members and the blade 180 is by means of pins 182. The blade 180, shaped as clearly illustrated in FIGURES 11 and 13, is provided with an upper cutting edge 184 which is parallel with and opposed to the cylindrical surface of the roller 52 mounted in the fitting 66. Clearly, the arrangement is such that appropriate pivotal movement of the toggle members 174 and 176 will move the edge 184 in a slicing action toward the roller 52 so that the interposed shock absorbing strap 40 will be severed.

The blade 180 includes an end extension 186 which passes through a suitably located slot 188 in the appropriate side member 71. The free end of this extension 186 is provided with a push button 190, and a compression spring 192 is disposed between the push button 190 and the adjacent side member 71 so as to bias the blade 180 toward a non-cutting position. The opposite side member 71 is also slotted at 193 so as to accommodate the toggle quadrant 176 as clearly shown in FIGURES 9 through 11. The upper portion of the quadrant 176 which extends outside the fitting 66 is provided with an aperture 194 in which is secured a flexible cable 196. This cable 196 passes downwardly alongside the adjacent side member 71 and then through an eyelet 198 mounted at the lower end of the side member. The free end of the cable 196 is provided with a laterally extending button-like head 200 adapted slidably to engage the aforementioned arcuate slot 162 provided in a side flange 148 of the actuator 144. The head 200 is shaped so that the cable 196 is retained from pulling through the slot, but so that it may be withdrawn from the slot 162 as the latter is pivoted downwardly to an appropriate open position such as depicted in FIGURE 16.

Operation

The foregoing description has been directed primarily to the structure and arrangement of the interconnected parts of the suspension system 30. In general, therefore, it has been assumed that the parachute has been in an opened operating condition. It is to be understood, however, that a parachute which embodies the suspension system 30 will normally be packed and carried on the person of the prospective user in the same manner as conventional parachutes. Thus, the fact, previously mentioned that the shock absorbing straps 40 illustrated in FIGURE 1 are in stretched or drawn condition so as to enable the riser portions 34 and 36 to be shown in fully extended condition does not prevent the original undrawn straps 40 from being retained in the undrawn state until the parachute is used. Normally then, the suspension system 30 is folded and packed, along with the parachute canopy (not shown), in the customary manner. The usual cloth-like enclosure and the means for releasing the same have not been shown, since they are conventional. Suffice it to say that such necessary accessories will normally be secured in appropriate manner to the body harness 32.

As previously mentioned, the body harness 32 incorporates the receiver assembly 86, and it will be understood that, until after the parachute has been used, the lower riser fitting 66 will be retained in hooked engagement with the receiver assembly 86. This hooked engagement is clearly illustrated in FIGURES 8 through 10, and 13. From the latter figure, it will be observed that the cross bar 72 of the fitting 66 is disposed within the hook 94 of the main base member 92. Further, the latch dog 114 is pivoted to a position where the arcuate surface 118 closes the hook opening and thereby prevents any possibility of the fitting 66 being detached therefrom. The latch dog 114 is retained in its illustrated closed position against the biasing action of the torsion spring 126 by virtue of the retainer 127 being also in an "up" position wherein the trough-like portion 128 is disposed around the lower portion 120 of the dog 114. The compression spring 142 is effective to maintain the retainer 127 in this position.

The interconnection of the retainer 127 and the actuator 144 by means of the links 168 requires the actuator 144 to be in the closed position, shown best in FIGURES 8 and 9, when the retainer 127 is in the aforementioned up position. The actuator 144 is retained in its closed position by the detent nibs 156 being engaged in the depressions 110 in the sides of the member 90. It will be noted that, with the actuator 144 in closed position, the cable 196 is engaged with the arcuate slot 162 in the actuator 144, notwithstanding which the spring 192 is enabled to bias the blade 180 to a retracted, non-cutting position.

With the parachute incorporating the suspension system 30 being worn in the manner of conventional parachutes, it will be understood that it is put into use in the same manner as conventional chutes, that is, by pulling a D-ring, or the like, to open the pack and allow the canopy and suspension system to be withdrawn. As is well known, the immediately ensuing opening shock of parachutes, particularly when employed at high speeds, is extremely violent. While parachutes themselves may be designed to withstand predictable shock loads, the person using the chute is also subjected to similar violent arrest, from which serious injuries may be sustained. FIGURES 6 and 7 illustrate the manner in which the suspension system 30 eases this opening shock so as to make less violent arrest of the user and at the same time reduce stresses that would otherwise be imposed on the parachute components. It may be mentioned, incidentally, that the illustrations of FIGURES 6 and 7 each show only half of the full suspension system 30 in that only the suspension lines 38, the riser strap 34 and the shock absorbing strap 40 associated with one side of the user are depicted.

As is clear from FIGURE 6, the initial load imposed by the opening of the parachute canopy is taken by the shock absorbing straps 40, and it will be apparent from the previously decsribed arrangement of the straps 40 in passing around the rollers 52 of the respective riser fittings that the loads will be equalized in the several runs 76, 78, 80 and 82. With the imposition of a predetermined minimum load upon the straps 40, they begin to draw out or stretch, thus absorbing much of the opening shock. If, for example, the draw load of each strap 40 is 250 pounds, it is obvious that each of the eight runs into which the two straps 40 are divided will begin to yield under a 250 pound stress so that the initial shock will be limited to approximately 2000 pounds or 10 G's for a 200 pound man. An elongation of as much as 300% to 400% of the original length of the undrawn straps 40 may be provided for if desired. The risers 68 and 70 meantime are in slack condition and remain so until the predetermined degree of elongation of the straps 40 has occurred. When the straps 40 have become sufficiently elongated, the load is, of course, then taken by the risers 68 and 70 as clearly illustrated in FIGURE 7. With the riser straps fully extended, the parachute descent may be continued in the normal manner.

Under certain circumstances, the straps 40 may be drawn to the breaking point, which, incidentally, will occur after a predetermined degree of shock absorbing stretch has occurred. A typical breaking load is approximately 1.75 times the draw load, which would provide a 3500 pound limit in the above example.

Frequently, as is well known, it is desired to release the parachute canopy and the suspension system as soon as a landing is made, this being particularly true when the landing is made in water or in a stiff breeze. Where such is desired in the case of the suspension system 30, the user has only to insert a thumb through each of the rings 164 and pull the actuators 144 forward and down to enable him to unhook the lower riser fitting from the receiver assembly 86. To be more specific, the forward and downward pivotal movement of the actuator 144 will, as clearly illustrated in FIGURES 14 through 16, draw the retainer 127 downwardly against the action of the spring 142, which will enable the torsion spring 126 to pivot the latch dog 114 forwardly and down also. At the same time, the forward and downward movement of the actuator 144 carries with it the lower end of the cable 196 fastened to the cutting assembly 170 so that the blade 180 is moved in a severing action toward the juxtaposed shock absorbing strap 40. With the strap 40 severed at this point, further downward movement of the actuator 144 is effective to withdraw the cable 196 from the arcuate slot 162, as shown in FIGURE 16. Obviously, with the latch dog 114 in opened condition and with the shock absorbing strap 40 severed where it passes through the lower riser fitting 66, the parachute user is at liberty to disengage the bar 72 from the hook 94 to free the canopy and the suspension system. As the canopy, the suspension lines 38 and the riser straps 34 depart, the severed shock absorbing straps 40 will run through the riser end fittings 42 and 56.

It is recognized that under certain conditions of light loading or unbalance, the right-hand and left-hand shock absorbing straps 40 may be drawn incompletely to different lengths so that the person using the parachute is supported by a canopy in other than normal level position. With the parachute canopy already opened, and the opening shock having already been absorbed, this condition of unbalance may be rectified by the operator pressing his thumb against the thumb plate 190 to actuate the cutting assembly 170. In doing this, the associated shock absorbing strap 40 will be severed and the weight of the operator transferred fully to the riser straps, without at the same time unlocking the canopy release assembly 86.

Although the suspension system 30 has been illustrated and described in connection with a personnel parachute, it is apparent that the principles of shock absorption here utilized may be employed also with cargo chutes. The latter use of course does not involve comfort or protection from personal injury, but does provide the possibility of using a lighter and hence less expensive canopy than would otherwise be required.

Clearly, there has been described a shock absorbing suspension system for parachutes which fulfills the objects and advantages sought therefor.

It is to be understood that the foregoing description and the accompanying drawings have been given only by way of illustration and example. It is further to be understood that changes in the form of the elements, rearrangement of parts, and the substitution of equivalent elements, all of which will be obvious to those skilled in the art, are contemplated as being within the scope of the present invention, which is limited only by the claims which follow.

What is claimed is:

1. A suspension system comprising, in combination, a harness assembly, a group of suspension lines, and elongated cord-like means including both yieldable cord-like means and substantially non-yieldable cord-like means interconnecting said harness assembly and said group of suspension lines, said yieldable cord-like means having terminated ends and comprising at least two strands of stretchable cord-like material and including pulley means centrally of its terminated ends for equalizing tension in the different strands of stretchable cord-like material.

2. The combination of claim 1 wherein the pulley means comprises a fitting for fixed securement of both the suspension lines and at least one end of the substantially non-yieldable cord-like means, said fitting having a roller for support of the stretchable cord-like material.

3. In a suspension system, in combination, a harness assembly, a first and a second group of suspension lines, shock absorbing means comprising a stretchable cord-like member interconnecting both of said groups of suspension lines with said harness, load supporting means comprising a separate strand of substantially non-yieldable cord-like material interconnecting each of said groups of suspension lines with said harness, said stretchable cord-like member having an unstretched length such as to require stretching of the member before a load can be supported by said substantially non-yieldable cord-like strands, and means associated with a central portion of said stretchable member for equalizing tensile stress throughout the length thereof as it stretches under load.

4. The combination of claim 3 wherein the load equalizing means comprises pulley means secured to said harness and engaging the central portion of the stretchable cord-like member intermediate the two groups of suspension lines.

5. The combination of claim 4 wherein the pulley means is incorporated in a riser fitting which also incorporates means for receiving the strands of substantially non-yieldable cord-like material, and means releasably securing said riser fitting to the harness assembly.

6. The combination of claim 5 wherein the harness assembly incorporates a receiver assembly for interlockingly receiving the riser fitting, said receiver assembly including means for selectively locking the riser fitting against inadvertent disengagement.

7. The combination of claim 5 wherein the stretchable member is secured at each end to the harness assembly, and selectively operable cutting means incorporated in the riser fitting for cutting the stretchable member intermediate its ends.

8. The combination of claim 7 wherein the harness assembly incorporates a receiver assembly for interlockingly receiving the riser fitting and wherein the cutting means includes an actuating element connected to the receiver assembly, and means incorporated in the receiver assembly for operating the actuating element.

9. A support arrangement for an article which is to be subjected to a shock force opposite in direction to the support arrangement comprising: a pair of separate retaining stations; flexible, substantially non-yielding cord means having an end attached to each of said stations, said cord means having a portion depending from said two ends and supported by said article; and a second flexible cord of resistingly yieldable, non-resilient material retained at separate portions thereof by said retaining stations; said second cord having a midportion depending from said separate portions; said midportion supporting said article; said second cord when said shock force is applied yielding its support of said article to said first cord.

10. The arrangement of claim 9 wherein said article has a roller structure; said midportion of said second cord passes around the roller of said roller structure; said roller rotating during the application of said shock force to make uniform the tension throughout the length of said second cord.

11. The device of claim 10 wherein at least one of said retaining stations includes a roller structure; said retained portion of said second cord associated with said last-mentioned station extends around said roller; and an end of said second cord is attached to said article; said last-mentioned retained portion being between said end and said midportion of said second cord; whereby said rollers cooperate to make uniform the tension throughout the length of said second cord when said shock force is applied.

12. The device of claim 10 wherein each of said retaining stations includes a roller structure; said retained portion of said second cord associated with each of said stations extends around its associated roller; and the ends of said second cord are attached to said article; said retaining portions being between said ends and said midportion of said second cord; whereby said rollers cooperate to make uniform the tension throughout the length of said second cord when said shock force is applied.

13. In a suspension system, a lower riser fitting having means for suspensive engagement with a shock absorbing strap, and selectively operable cutting means for cutting said shock absorbing strap, a receiver assembly releasably engaging said fitting and having locking means for blocking inadvertent release of the fitting, and actuator means connected with said cutting means for simultaneously actuating said locking means so as to enable release of the fitting and cutting said shock absorbing strap.

14. The combination of claim 13 wherein the cutting means comprises a blade movably mounted in the lower riser fitting and the actuator means includes an actuator mounted thereon and movable relative to the fitting, and means interconnecting said actuator and said blade for operating the latter with the former, said interconnecting means having releasable engagement with the actuator for effecting release therebetween after a cutting action.

15. The combination of claim 14 wherein the releasable engagement of the interconnecting means with the actuator comprises an open-ended arcuate slot in the actuator and a headed element on the interconnecting means, said headed element having slidable engagement with said slot.

16. The combination of claim 14 wherein the cutting means includes an operating element in addition to the aforesaid means interconnecting the actuator and the blade for selectively actuating the blade without simultaneously actuating the locking means.

17. In a suspension system, in combination, a harness assembly, a first group of suspension lines, means including a shock absorbing cord-like member interconnecting said suspension lines and said harness, both ends of said member being secured to said harness assembly, first pulley means secured to said suspension lines, a second group of suspension lines, second pulley means secured to said second group of suspension lines, and third pulley means secured to said harness assembly, said cord-like member being disposed to extend in order through said first, third, and second pulley means.

18. In a suspension system, in combination, a harness assembly, a first and a second group of suspension lines, shock absorbing means comprising a stretchable cord-like member interconnecting both of said groups of suspension lines with said harness, and pulley means secured to said harness and movably engaging said cord-like member intermediate the two groups of suspension lines, said pulley means incorporating means for cutting the cord-like member so as to detach the suspension lines from the harness.

19. A riser arrangement of the kind described: comprising a continuous strip of relatively inelastic, flexible material having two spaced loops for attachment to spaced supports and having a midportion depending from the loops from which an article may be supported; and a second continuous strip of resistingly stretchable, yieldable, non-resilient material having its ends connected with the two spaced loops of the first-named strip and its midportion lying alongside the midportion of the inelastic strip, the article depending from the midportion of both strips, the first strip being initially longer than the non-resilient strip, the article being supported by the non-resilient strip until subjected to such shock loads as will cause the non-resilient strip to stretch under the strain caused by the article to at least the length of the first strip.

20. The riser of claim 19, wherein the second strip extends continuously around at least one of the loops and back downwardly for attachment at a point spaced from the loop.

21. The riser of claim 19 wherein the second strip has both ends so extended.

References Cited in the file of this patent

UNITED STATES PATENTS

| Number | Name | Date |
|---|---|---|
| 1,177,927 | Calthrop | Apr. 4, 1916 |
| 2,454,616 | Schultz | Nov. 23, 1948 |
| 2,462,234 | Supina | Feb. 22, 1949 |
| 2,474,124 | Schultz | June 29, 1949 |
| 2,499,107 | Miller | Feb. 28, 1950 |
| 2,594,018 | Hillesheim | Apr. 22, 1952 |
| 2,825,515 | Gold | Mar. 4, 1958 |

FOREIGN PATENTS

| | | |
|---|---|---|
| 757,245 | France | Oct. 9, 1933 |